Sept. 25, 1962
C. E. HODGES
3,055,955
PROCESS FOR THE PRODUCTION OF VINYL CHLORIDE
Filed Oct. 12, 1960
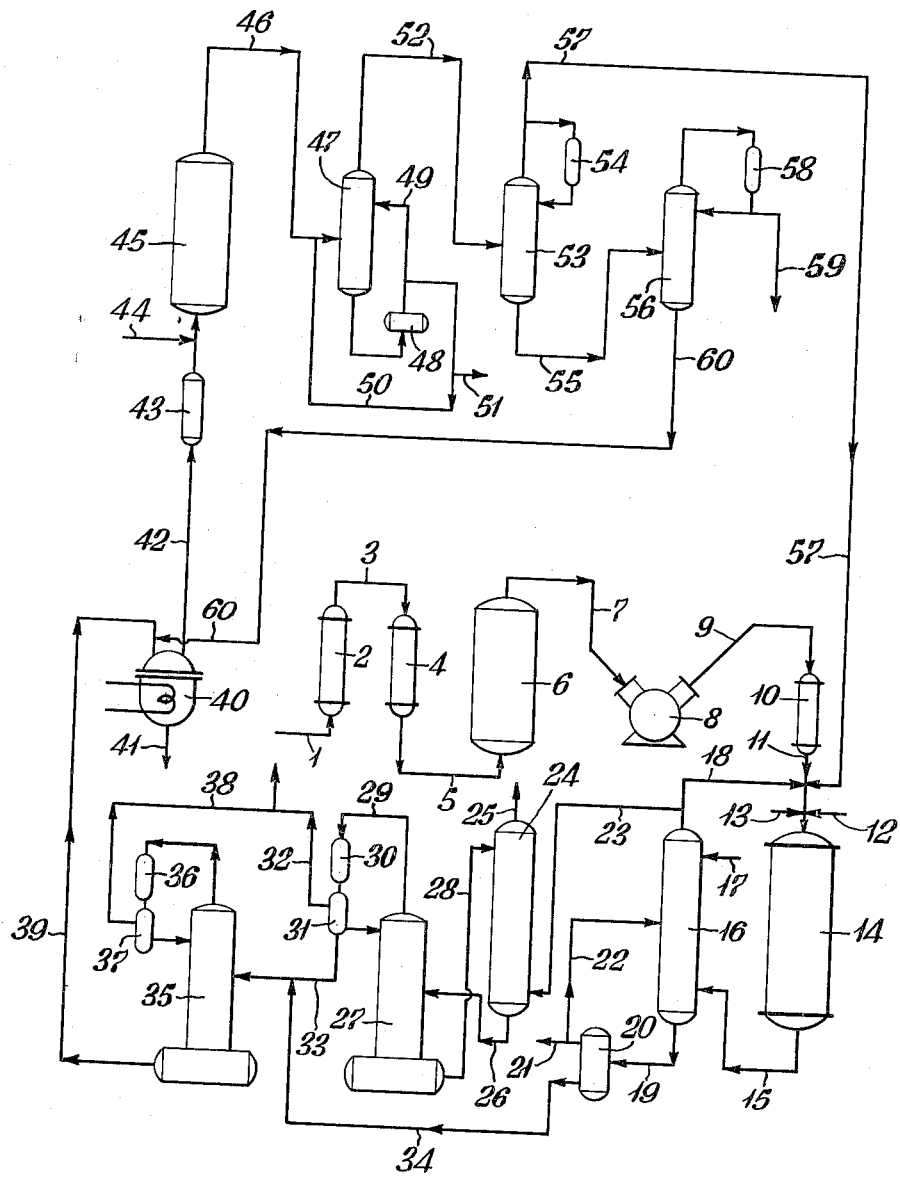
INVENTOR.
CHARLES E. HODGES
BY
Donal E. McCarthy
ATTORNEY

United States Patent Office 3,055,955
Patented Sept. 25, 1962

3,055,955
PROCESS FOR THE PRODUCTION OF
VINYL CHLORIDE
Charles E. Hodges, South Charleston, W. Va., assignor to Union Carbide Corporation, a corporation of New York
Filed Oct. 12, 1960, Ser. No. 62,229
14 Claims. (Cl. 260—656)

This invention relates to an improved process for the production of vinyl chloride.

Vinyl chloride is commonly produced by the pyrolytic dehydrochlorination of 1,2-dichloroethane, which is prepared commercially by the additive chlorination of ethylene. In this process the cost of producing vinyl chloride is relatively high unless the by-product hydrogen chloride can be used profitably for other reactions. Other commercial processes for the manufacture of vinyl chloride make use of a hydrocarbon, such as ethane or ethylene, and chlorine as starting materials. These processes also have the disadvantage of producing large quantities of hydrogen chloride. Therefore, a significant portion of the chlorine employed forms a product which has relatively little value. Other established processes for the production of vinyl chloride involve the catalytic hydrochlorination of acetylene, which is a much more expensive raw material than ethane or ethylene.

An object of the present invention is to provide an improved process for the production of vinyl chloride.

Another object of the present invention is to provide a process for the production of vinyl chloride utilizing ethyl chloride, which is an inexpensive by-product of other reactions, and air as the major raw materials in a very efficient manner.

A further object of the invention is the production of vinyl chloride without the corporation of large quantities of by-products.

Other objects and advantages of the invention will become apparent from the following detailed description thereof.

The improved process of the invention involves a stepwise process in which ethyl chloride is pyrolyzed to yield ethylene and hydrogen chloride which are subsequently reacted in a second reaction stage with oxygen or air, in the presence of a small quantity of make-up ethylene, to form ethylene dichloride. The ethylene dichloride is finally pyrolyzed to give vinyl chloride and hydrogen chloride, the latter product being recycled to the second stage. The process utilizes readily available ethyl chloride and air, which constitute the major raw materials for the synthesis of vinyl chloride. Essentially complete utilization of the ethyl chloride to vinyl chloride is accomplished, with little net production of hydrogen chloride and other undesirable by-products.

In its simplest form, the invention consists of decomposing ethyl chloride over a suitable catalyst to yield ethylene and hydrogen chloride in equimolar amounts; reacting the ethylene and the hydrogen chloride with oxygen or air in the presence of a second catalyst to form ethylene dichloride (1,2-dichloroethane), minor amounts of chlorinated by-products, and carbon oxides; and then decomposing the ethylene dichloride to give vinyl chloride and hydrogen chloride. The hydrogen chloride from this last pyrolysis step is recycled to the second stage of the process where it is combined with ethylene and hydrogen chloride obtained from the first stage of the process.

In order to set forth more fully the nature of the invention, it will be described in detail with reference to the attached drawing wherein the figure represents diagrammatically one form of apparatus suitable for executing the process of the invention. While the conditions for performing each step of the process described herein may be varied widely without altering the basic nature of this invention, the preferred form of the invention is represented by the attached flow diagram, which is illustrative of the process rather than limitative.

In the first step of the process, about 2.3 moles of liquid ethyl chloride are pumped via line 1 into a steam-heated vessel 2 which serves as a vaporizer. The ethyl chloride vapors pass via line 3 through a preheater 4, and from there via line 5 into a reactor 6 packed with a thorium chloride-activated alumina catalyst. The amount of thorium contained in the catalyst may vary from about 1 to about 25 percent by weight, and preferably is from about 10 to about 15 percent by weight of the thorium containing compound together with the alumina. Decomposition of the ethyl chloride takes place rapidly in the presence of this catalyst. As a result, contact times between the ethyl chloride and the catalyst may range from 0.05 to 60 seconds at a catalyst temperature of about 250° to 500° C. Preferred conditions include a contact time of 3 to 10 seconds and a reaction temperature of 320° to 400° C. Although atmospheric pressures are preferred, the dehydrohalogenation step may be carried out at pressures up to 150 p.s.i.g. or subatmospheric pressures of 10 mm. of mercury. At operating conditions which include a catalyst temperature of 350° C., atmospheric pressure, and a contact time of about 6 seconds, 94 percent of the ethyl chloride is converted to ethylene and hydrogen chloride at an efficiency of more than 99 percent. To bring the products from reactor 6 to the desired temperature and pressure required for the second step of process, they are passed lines 7 and 9 though auxiliary equipment such as a compressor 8 and a heat exchanger 10.

About 2.1 moles each of ethylene and of hydrogen chloride, and less than 0.2 mole of unconverted ethyl chloride, obtained from the decomposition of ethyl chloride, are conducted via line 11 to a second reactor 14. Prior to entering reactor 14, this stream is admixed with 1.7 moles of by-product hydrogen chloride obtained from the third step of the process, with about 1.0 mole of oxygen introduced as pure material or as air through line 12, with about 0.2 mole of make-up ethylene introduced by line 13, and with a recycle stream introduced via line 18. This recycle stream contains about 1.6 moles of unreacted ethylene and less than 0.4 mole of oxygen, and minor quantities of ethylene dichloride, ethyl chloride, and carbon dioxide produced in reactor 14. It also contains considerable quantities of nitrogen if air rather than oxygen is fed through line 12. The blended feed stream entering reactor 14 contains approximately 4 moles of ethylene, 4 moles of hydrogen chloride, and 1.4 moles of oxygen.

In reactor 14, which is packed with a catalyst of copper and alumina, or other material capable of promoting the oxidation of hydrogen chloride and the chlorination of ethylene, the ethylene, hydrogen chloride, and oxygen react via a modified Deacon reaction to form ethylene dichloride, water and very minor quantities of unrecovered by-products. Catalysts which are operative for this purpose comprise copper containing compounds on an inert support having a relatively high surface area, such as alumina, activated carbon, silica, absorbent clays, and the like. The catalyst which is preferred for this reaction consists of ⅜-inch pellets containing about 4 to about 12 percent of copper (present initially as the chloride) intimately co-mixed with amorphous alumina. The reaction conditions applicable to the modified Deacon reaction may be varied widely. Temperatures in the range of 220° C. to 320° C. are suitable, and pressures of from less than one atmosphere to 300 p.s.i.g. may be employed. The reaction contact time is dependant upon the temperature and pressure and may vary from about 1 to about 20 seconds. The preferred conditions include a reaction temperature of 250° to 280° C. at a system pressure of 100 to 200 p.s.i.g. and a contact time of 6 to 8 seconds.

In the modified Deacon reaction, approximately 96 percent of the hydrogen chloride and 56 percent of the ethylene are reacted per pass under the preferred conditions to give ethylene dichloride at an efficiency of 98 percent based on hydrogen chloride and 87 percent based on ethylene. The hot product stream from reactor 14 is conducted via line 15 to a quencher-scrubber 16 wherein the small quantity of unreacted hydrogen chloride is absorbed in water and a major portion of the ethylene dichloride product is condensed. The liquid effluent from the quencher-scrubber enters a decanter 20 via line 19 and separates into two phases. A portion of the upper aqueous phase is discarded via line 21, while a portion is recycled via line 22 to the quencher-absorber. The ethylene dichloride phase is transferred from the decanter via line 34 to the drying still 35. The gases uncondensed and unabsorbed in the quencher are finally scrubbed in the upper section of the quencher with fresh water injected via line 17 to remove the last traces of unreacted hydrogen chloride and to maintain the desired temperature in the quencher-scrubber. The scrubbed gas stream subsequently divides into two streams, one of which is recycled via line 18 to reactor 14, and one of which is conducted via line 23 to scrubber 24. In this scrubber, ethylene dichloride is absorbed from the gas stream in di(2-chloro ethyl) ether or some other suitable solvent for ethylene dichloride. The scrubbed gas stream is subsequently discharged to the atmosphere via line 25.

The liquid mixture of ethylene dichloride, solvent, water and other products of the modified Deacon reaction is conducted via line 26 to a still 27 in which the solvent is recovered for recycle via line 28 to the scrubber 24. The distillate from still 27 is liquefied in condenser 30 and separated into two components in decanter 31. The upper aqueous phase is discharged via line 32, while a portion of the lower ethylene dichloride phase is recycled as reflux via line 29 to still 27 and a portion passes via line 33 to still 35.

In still 35 the water-saturated ethylene dichloride is dried by distilling a mixture of ethylene dichloride and water overhead, which is then liquefied in condenser 36 and separated in decanter 37. The refined ethylene dichloride is recovered from still 35 via line 39 and then conducted to the vaporizer 40 for use in the third reaction step. The aqueous phase from decanter 37 is discharged via line 38.

Two moles of ethylene dichloride produced in the second reaction step are vaporized in the steam heated vessel 40. Material boiling higher than ethylene dichloride is periodically removed from vaporizer 40 via line 41 to maintain a proper operating level in this vessel. The ethylene dichloride vapors are introduced via line 42 into a preheater 43 and then into a gas-fired furnace 45, which is maintained at a temperature of about 350° to 700° C. Other conditions include a pressure of 0 to 150 p.s.i.g. and a contact time of from about 1 to 30 seconds. Preferably this step is carried out at a furnace temperature of from about 450° C. to 500° C. at a pressure of about 50 to 70 p.s.i.g. and a contact time of 8 to 11 seconds. Minor amounts of chlorine are added as a catalyst via line 44 to the vapors prior to entering the furnace 45. By recycling the unreacted ethylene dichloride approximately 95 to 97 percent of the ethylene dichloride is ultimately converted to vinyl chloride, hydrogen chloride, and minor amounts of other useful chlorinated by-products when the preferred reaction conditions are employed.

The hot furnace effluent is conducted via line 46 to a quencher 47 where it is quenched with the recycled condensate. The quenching liquid is circulated through a heat exchanger 48 and divided into two portions which are recycled to the quencher via lines 49 and 50. Carbon and other solid by-products of the pyrolysis step are removed from the cycle stream 50 via line 51. The product stream, cooled to a temperature above the dew point of its components, enters still 53 via line 52. In the still, which operates with a reflux condenser 54, all materials boiling above hydrogen chloride are separated and cycled via line 55 to a second still 56. The uncondensed hydrogen chloride is conducted via line 57 to the second stage of the process. In still 56, which is equipped with a reflux condenser 58, all materials boiling higher than vinyl chloride are separated and removed via line 60 and combined with the stream entering vaporizer 40. Vinyl chloride is removed from the still via line 59.

Although a preferred product recovery system applicable to the modified Deacon reaction and the ethylene dichloride pyrolysis (steps 2 and 3 of the over-all process) are shown and described, other recovery systems may be employed without departing from the invention. The modified Deacon reaction (step 2) may be operated with a feed containing a stoichiometric excess of hydrogen chloride and oxygen rather than ethylene and oxygen, with similar results. Thus a feed mole ratio of hydrogen chloride to ethylene to oxygen of 4 to 1 to 0.5 has been found to give substantially complete conversions of ethylene and efficiencies to ethylene dichloride equivalent to those applicable for a system operated with an excess of ethylene. When the feed contains an excess of hydrogen chloride, the hydrogen chloride not reacted in a single pass is recovered by absorption in water. It is then concentrated and recycled to the reactor either as an essentially anhydrous gas or as the azeotrope with water.

It will be obvious to those skilled in the art that my invention is capable of various modifications, and I do not desire, therefore, to be restricted to the precise details shown and described but only within the scope of the appended claims.

I claim as my invention:

1. An improved process for the production of vinyl chloride comprising the steps; (1) pyrolyzing ethyl chloride to yield ethylene and hydrogen chloride, (2) adding air to said ethylene and hydrogen chloride to form ethylene dichloride, and (3) pyrolyzing said ethylene dichloride to produce vinyl chloride and hydrogen chloride.

2. An improved process for the production of vinyl chloride comprising the steps; (1) pyrolyzing ethyl chloride to yield ethylene and hydrogen chloride, (2) adding oxygen to said ethylene and hydrogen chloride to form ethylene dichloride, and (3) pyrolyzing said ethylene dichloride to produce vinyl chloride and hydrogen chloride.

3. An improved process for the production of vinyl chloride comprising the steps of; (1) thermally decomposing ethyl chloride in the presence of a thorium chloride-activated alumina catalyst to yield ethylene and hydrogen chloride, (2) adding air to said ethylene and hydrogen chloride in the presence of a catalyst, which is capable of promoting the oxidation of hydrogen chloride and the chlorination of ethylene, to form ethylene dichloride, and (3) thermally decomposing said ethylene dichloride to give vinyl chloride and hydrogen chloride.

4. An improved process for the production of vinyl chloride comprising the steps of; (1) thermally decomposing ethyl chloride in the presence of a thorium chloride-activated alumina catalyst to yield ethylene and hydrogen chloride, (2) adding oxygen to said ethylene and hydrogen chloride in the presence of a catalyst, which is capable of promoting the oxidation of hydrogen chloride and the chlorination of ethylene, to form ethylene dichloride, and (3) thermally decomposing said ethylene dichloride to give vinyl chloride and hydrogen chloride.

5. A process as claimed in claim 3, wherein the catalyst used which is capable of promoting the oxidation of hydrogen chloride and the chlorination of ethylene is a copper-alumina catalyst.

6. A process as claimed in claim 4, wherein the catalyst used which is capable of promoting the oxidation of hydrogen chloride and the chlorination of ethylene is a copper-alumina catalyst.

7. An improved process for the production of vinyl chloride comprising the steps of; (1) pyrolyzing ethyl chloride to yield ethylene and hydrogen chloride, (2) adding air and additional hydrogen chloride to said ethylene and hydrogen chloride to form ethylene dichloride, (3) pyrolyzing said ethylene dichloride to produce vinyl chloride and hydrogen chloride, and (4) recycling said hydrogen chloride back to the second step.

8. An improved process for the production of vinyl chloride comprising the steps of; (1) pyrolyzing ethyl chloride to yield ethylene and hydrogen chloride, (2) adding oxygen and additional hydrogen chloride to said ethylene and hydrogen chloride to form ethylene dichloride, (3) pyrolyzing said ethylene dichloride to produce vinyl chloride and hydrogen chloride, and (4) recycling said hydrogen chloride back to the second step.

9. An improved process for the production of vinyl chloride comprising the steps of; (1) thermally decomposing ethyl chloride in the presence of a thorium chloride-activated alumina catalyst to yield ethylene and hydrogen chloride, (2) adding air and additional hydrogen chloride to said ethylene and hydrogen chloride in the presence of a catalyst, which is capable of promoting the oxidation of hydrogen chloride and the chlorination of ethylene, to form ethylene dichloride, (3) thermally decomposing said ethylene dichloride to give vinyl chloride and hydrogen chloride, and (4) recycling said hydrogen chloride to the second step.

10. An improved process for the production of vinyl chloride in the presence of a thorium chloride-activated alumina catalyst to yield ethylene and hydrogen chloride, (2) adding oxygen and additional hydrogen chloride to said ethylene and hydrogen chloride in the presence of a catalyst, which is capable of promoting the oxidation of hydrogen chloride and the chlorination of ethylene, to form ethylene dichloride, (3) thermally decomposing said ethylene dichloride to give vinyl chloride and hydrogen chloride, and (4) recycling said hydrogen chloride to the second step.

11. A process as claimed in claim 9, wherein the catalyst used which is capable of promoting the oxidation of hydrogen chloride and the chlorination of ethylene is a copper-alumina catalyst.

12. A process as claimed in claim 10, wherein the catalyst used which is capable of promoting the oxidation of hydrogen chloride and the chlorination of ethylene is a copper-alumina catalyst.

13. An improved process for the production of vinyl chloride comprising the steps of; (1) heating ethyl chloride in the presence of a thorium chloride-activated alumina catalyst for 0.05 to 60 seconds at a catalyst temperature of about 250 to 500° C. and at pressures ranging from 10 mm. of mercury to 150 p.s.i.g. in order to produce ethylene and hydrogen chloride, (2) adding air and additional hydrogen chloride to said ethylene and hydrogen chloride in the presence of a copper-alumina catalyst at a reaction temperature of 220 to 320° C., a system pressure of about one atmosphere to 300 p.s.i.g. and a contact time of from about 1 to 20 seconds, to form ethylene dichloride, (3) heating said ethylene dichloride at a temperature of approximately 350° C. to 700° C., a pressure of 0 to 150 p.s.i.g., and for a time of from about 1 to 30 seconds to give vinyl chloride and hydrogen chloride, and (4) recycling said hydrogen chloride to the second step.

14. An improved process for the production of vinyl chloride comprising the steps of; (1) heating ethyl chloride in the presence of a thorium chloride-activated alumina catalyst for 0.05 to 60 seconds at a catalyst temperature of about 250 to 500° C. and at pressures ranging from 10 mm. of mercury to 150 p.s.i.g. in order to produce ethylene and hydrogen chloride, (2) adding oxygen and additional hydrogen chloride to said ethylene and hydrogen chloride in the presence of a copper-alumina catalyst at a reaction temperature of about 250° to 280° C., a system pressure of about 100 to 200 p.s.i.g., and a contact time of 6 to 10 seconds, to form ethylene dichloride, (3) heating said ethylene dichloride at a temperature of approximately 450 to 500° C., a pressure of 50 to 70 p.s.i.g., and for a time of about 8 to 11 seconds to give vinyl chloride and hydrogen chloride, and (4) recycling said hydrogen chloride to the second step.

References Cited in the file of this patent

UNITED STATES PATENTS 2,288,580    Baer et al.              June 30, 1942

FOREIGN PATENTS 537,198    Canada               Feb. 12, 1957